US006231952B1

(12) United States Patent
Lipper

(10) Patent No.: US 6,231,952 B1
(45) Date of Patent: May 15, 2001

(54) IDENTIFICATION CARD WITH INTEGRAL REMOVABLE TATTOO

(76) Inventor: Christopher Lipper, 35 Buckley Hill Rd., Morristownship, NJ (US) 07960

( * ) Notice: Subject to any disclaimer, the term of this patent is extended or adjusted under 35 U.S.C. 154(b) by 0 days.

(21) Appl. No.: 09/110,551

(22) Filed: Jul. 6, 1998

Related U.S. Application Data

(63) Continuation-in-part of application No. 08/914,128, filed on Jul. 19, 1997, now Pat. No. 5,776,586, which is a continuation-in-part of application No. 08/621,469, filed on Mar. 26, 1996, now abandoned.

(51) Int. Cl.[7] .............................. B32B 27/14; B32B 3/00

(52) U.S. Cl. ......................... 428/195; 428/40.1; 428/192; 428/914

(58) Field of Search ............................. 428/13, 192, 195, 428/914, 40.1; 283/74, 75; 229/92.8; 427/149

(56) References Cited

U.S. PATENT DOCUMENTS

| | | | | |
|---|---|---|---|---|
| 4,200,222 | * | 4/1980 | Feuer | 229/92.8 |
| 4,340,810 | * | 7/1982 | Glass | 235/375 |
| 4,439,941 | * | 4/1984 | Halperin | 40/124.1 |
| 4,516,793 | * | 5/1985 | Kiyokane | 283/103 |
| 4,522,864 | * | 6/1985 | Humason et al. | 428/201 |
| 4,594,276 | * | 6/1986 | Relyea | 428/40 |
| 4,634,849 | * | 1/1987 | Klingen | 235/487 |
| 4,770,320 | * | 9/1988 | Miles et al. | 221/33 |

OTHER PUBLICATIONS

Temporary Tattoos, California Tattoo Manufacturing Company Inc.*

* cited by examiner

*Primary Examiner*—Bruce H. Hess
*Assistant Examiner*—B. Shewareged
(74) *Attorney, Agent, or Firm*—Law Offices of Royal W. Craig

(57) ABSTRACT

A tattoo identification card and promotional schedule card, both with integral removable tattoo.

The tattoo identification card is a coated card stock sheet similar to a greeting card and having at least one surface bearing a printed section to be filled in with information about the particular child bearing the card. The tattoo identification card also comprises a removable tattoo displaying secondary printed matter. The removable tattoo is formed from a panel of porous decal paper, a water soluble slip layer carried on one side of said porous decal paper, a water resistant film carried on the water soluble slip layer, secondary identification information printed on the water resistant film, and a layer of pressure sensitive adhesive covering the secondary printed matter. A reattachable bonding agent is applied to the other side of the porous decal paper along an edge for removably attaching it to the card stock sheet. The card stock sheet is intended for conveying individual child identification information, and the removable tattoo (which may be removed and applied elsewhere) adds the capability of conveying secondary identification information.

In accordance with another embodiment of the present invention, a promotional schedule card with integral removable tattoo is provided. The promotional schedule card includes a laminated card stock sheet similar to a trading card having at least one surface bearing a printed schedule. In addition, the promotional schedule card likewise includes a removable tattoo displaying secondary printed matter. The tattoo is formed as described above, and is attached to at least partially cover the printed schedule on the card stock sheet. In this manner, the tattoo exposes and reveals the schedule upon removal of the tattoo.

14 Claims, 5 Drawing Sheets

IDENTIFICATION CARD WITH INTEGRAL REMOVABLE TATTOO

CROSS-REFERENCE TO RELATED APPLICATONS

The present application is a continuation-in-part of application Ser. No. 08/914,128, filed Jul. 19, 1997, now U.S. Pat. No. 5,776,586, by the inventor herein for his "PROMOTIONAL, HANG-TAG WITH INTEGRAL REMOVABLE TATTOO", which is a continuation-in-part of Ser. No. 08/621,469 filed Mar. 26, 1996 (abandoned).

BACKGROUND OF THE INVENTION

1. Field of the invention

The present invention relates to cards incorporating integral removable tattoos and, more particularly, to child identification cards or, alternatively, promotional schedule cards both for conveying printed information directly and via an integral removable tattoo for respective tracking and/or promotional purposes.

2. Description of the Background

Child identification labels are simple stick-on or sewn-on strips having a child's identification information printed thereon. Unfortunately, conventional labels are limited in their effectiveness. First of all, they carry only identification text and graphics and are somewhat mundane and unnoticeable. Secondly, the labels are difficult to attach and remove as they are commonly sewn onto an article of clothing. Such difficulty discourages everyday use. Moreover, children require frequent clothing changes and this defeats the purpose altogether.

Accordingly, a need exists for an economical, convenient means of identifying children in an exciting and eye-catching way, thereby encouraging use by children and parents alike.

There now exists a process for making improved decals by securing an extremely thin, flexible and extensible design closely simulating an actual tattoo. As one example of a thin-film design, U.S. Pat. No. 4,522,864 issued Jun. 11, 1985 to Humason et al. discloses "Decals and Process for Making Same". The disclosed decals include a multi-layer-paper backing, water soluble slip layer, waterproof film coating, lithograph offset printed design, and transparent pressure sensitive adhesive. Decals of this type appear very bright, exciting and eye-catching. It would be greatly advantageous to combine such decals in a child identification card so as to make the card more compelling. Moreover, by making the tattoo detachable, the identifying value is propagated by the tattoo even after the card has been removed and/or discarded.

The same concept for identifying children by a device that will encourage use may also be employed in the context of a promotional sports schedule card.

Of course, both child identification and promotional schedule card embodiments must leave sufficient space for instructions and advertising, and they must be very economical to manufacture.

SUMMARY OF THE INVENTION

In accordance with the above, it is an object of the present invention to provide a simple inexpensive and convenient identification card with integral removable tatoo that is stimulating, eye-catching and effective, thereby encouraging regular use.

It is another object to provide an identification card with integral removable tatoo for identification of children, the disabled, elderly suffering from alzheimers, and others who lack the capacity for self-identification.

It is another object to provide an identification card as a means for advertising by sponsors, and bearing an integral removable tatoo for further advertising and promotion to encourage regular use.

While employing the same general concept, it is another object to provide a promotional schedule card with integral removable tattoo to provide an advertising medium with a lasting impact, even after the card has been removed and/or discarded the tattoo adds value, and vice versa.

According to the present invention, the above-described and other objects are accomplished by providing a tattoo identification card with integral removable tattoo. The tattoo identification card comprises a coated card stock sheet having at least one surface bearing a printed section to be filled in with information about the particular child bearing the card. The tattoo identification card also comprises a removable tattoo displaying secondary printed matter. The coated card stock sheet contains an area for parents or others to pen in identification information and, additionally, ample area for print advertising by sponsors. Such advertising promotes goodwill by association with the underlying purpose of the device. The removable tattoo is formed from a panel of porous decal paper, a water soluble slip layer carried on one side of said porous decal paper a water resistant film carried on the water soluble slip layer, secondary identification information printed on the water resistant film, and a layer of pressure sensitive adhesive covering the secondary printed matter. A reattachable bonding agent is applied to the other side of the porous decal paper along an edge for removably attaching it to the card stock sheet. The removable tattoo (which may be removed and applied elsewhere) adds the capability of conveying secondary identification information, further advertising, or character logos and designs to encourage widespread use.

In accordance with another embodiment of the present invention, a promotional schedule card with integral removable tattoo is also provided. The promotional schedule card includes a laminated card stock sheet having at least one surface bearing a printed schedule, team roster or the like. In addition, the promotional schedule card likewise includes a removable tattoo displaying secondary printed matter. The tattoo is formed as described above, and is attached to at least partially cover the printed schedule on the card stock sheet. In this manner, the tattoo exposes and reveals the schedule or other information upon removal of the tattoo.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENTS

Figure 1:
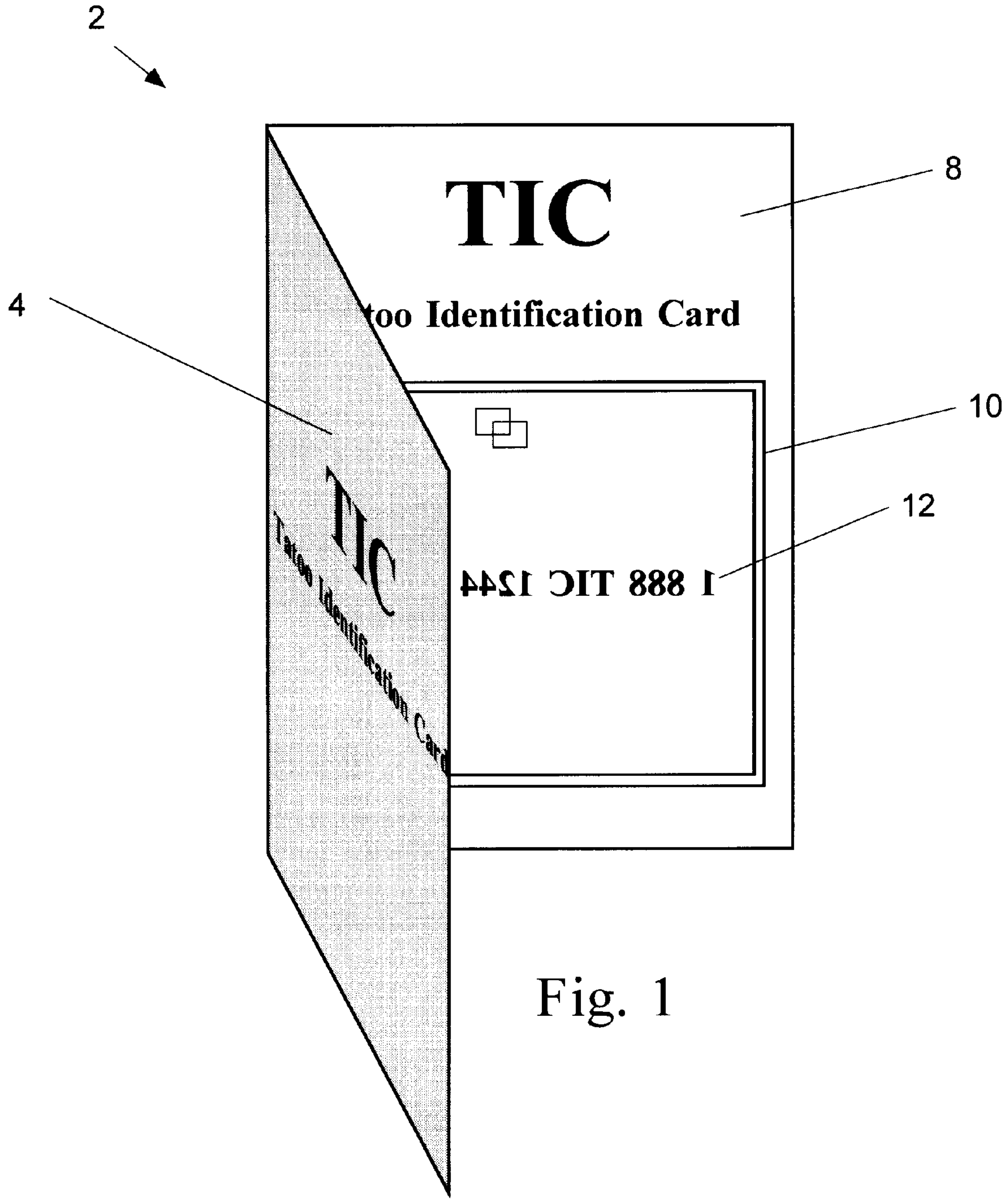
FIG. 1 is a front perspective view of an exemplary folded tattoo identification card 2 with integral temporary tattoo 10 according to one embodiment of the present invention.

FIG. 1 is a front perspective view of an exemplary folding tattoo identification card 2 with integral temporary tattoo 10 according to one embodiment of the present invention.

The tattoo identification card 2 of the present invention provides an economical and convenient means of securing child identification information to products such as clothing and accessories, or as a stand-alone item. Tattoo identification card 2 is formed of plastic-coated card stock and is folded vertically in the manner of a greeting card. The front panel 4 may be printed and/or embossed to convey information such as the name of the card, corporate sponsors, or telephone number, etc. The interior of tattoo identification card 2 is defined by opposing panels, and the removable tattoo 10 bearing the telephone number of the appropriate agency and/or other design elements such as a logo 12 is removably attached to one panel 8.

Figure 2:
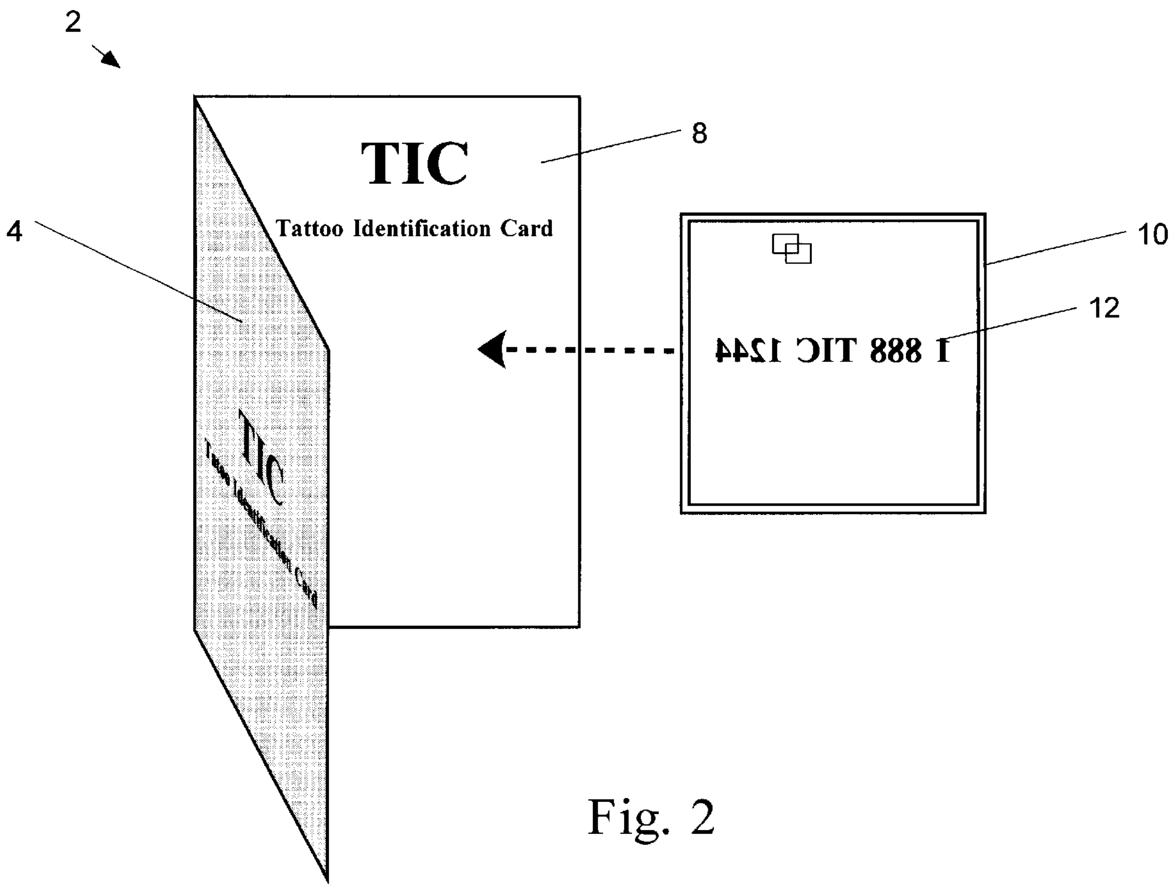
FIG. 2 is a break-away perspective drawing showing the temporary tattoo 10 removed from the folded tattoo identification card 2.

FIG. 2 is a break-away perspective drawing showing the temporary tattoo 10 removed from the folded tattoo identification card 2. The layers of the temporary tattoo include a base piece of decal paper (to be described) which is preferably glued to the one side 8 of the interior of card stock 2 using a specialized reattachable bonding agent such as that which is commercially available from 3M Corporation®. The tattoo 10 is of simple and inexpensive design and allows the attachment of an extremely thin and flexible design logo incorporating graphics. The graphics may include a phone number for a missing child hotline, a character logo or design to stimulate use by children, or the like. The tattoo 10 may be adhered to a flat surface such as skin in order to simulate an actual tattoo. Nevertheless, while on the card stock 2 the tattoo 10 leaves sufficient space for consumer product and pricing information. Most importantly, tattoo 10 does not significantly raise the cost of the identification card. It has been calculated that an identification card 2 with tattoo according to the present invention can be produced and sold for about 7–8 cents each. In contrast, a twice-printed card, or one incorporating some other inserted means of conveying retail information, e.g. a drop-card or adhesive foil decal, would sell for between 10–15 cents each.

Figure 3:
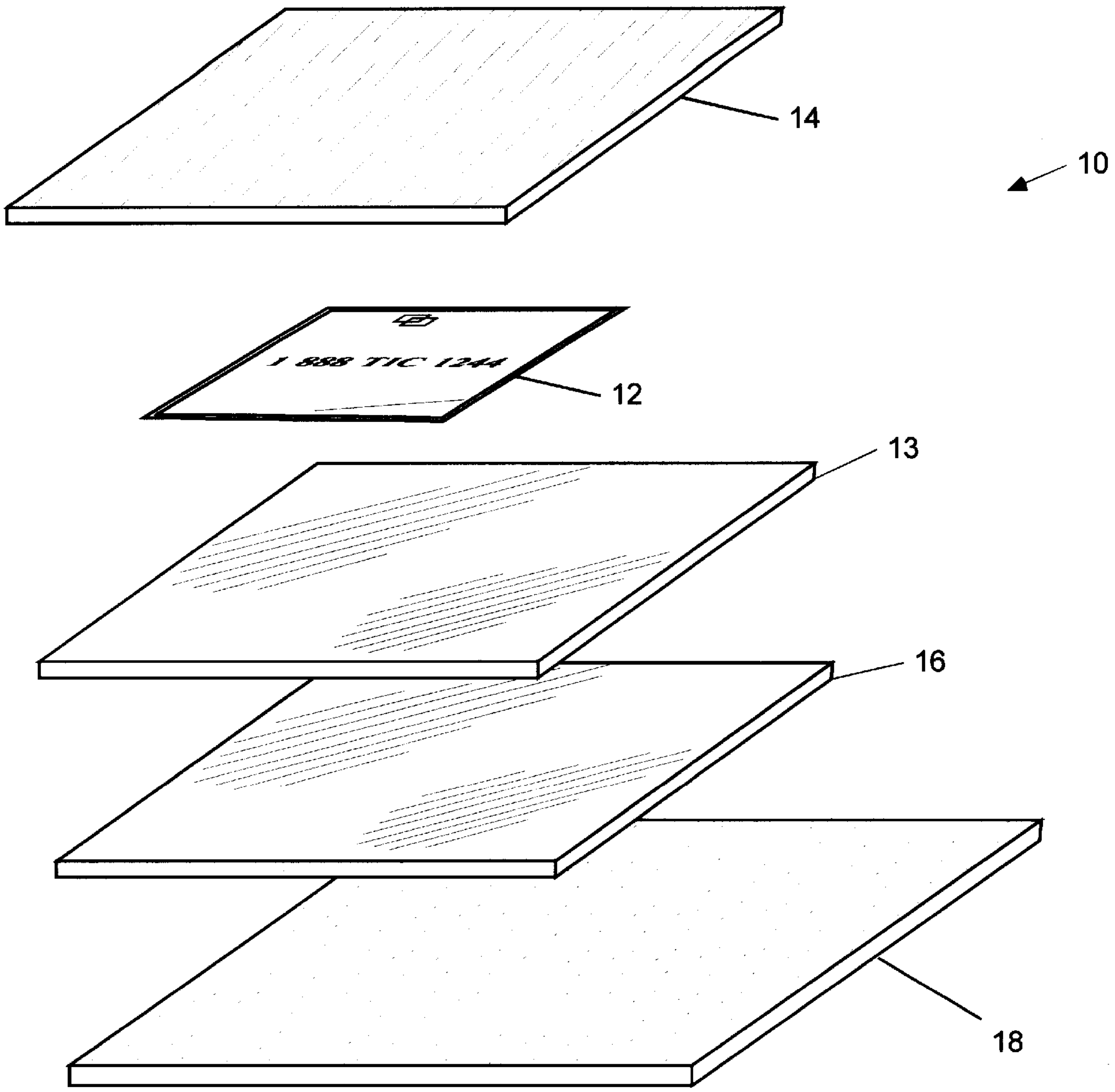
FIG. 3 is a side perspective drawing of the temporary tattoo 10 with various layers exposed.

FIG. 3 is a side perspective drawing of the temporary tattoo 10 with various layers exposed.

As seen in FIG. 3, the tattoo 10 used in the present invention is a multi-color offset print logo 12 on an extremely thin, flexible, extensible film of water resistant material 13, which in turn covers a water soluble slip layer 16 carried on porous decal paper 18.

A uniform deposit of pressure sensitive adhesive 14 covers the design logo 12 and is adapted to hold the design against the surface to which it will be applied, and to protect it from disruption during application.

The tattoo incorporated in the present invention as shown in FIG. 3 lends itself to application to any flat surface including skin, and it closely simulates an actual tattoo by virtue of its extremely thin, flexible, extensible, matte surfaced film 13. A multi-color offset lithograph message 12 (missing child hotline or other design) is imprinted on film 13. Printed logo 12 comprises an extremely thin application of colored ink (or multiple applications for different colors) to thin film 13. Pressure sensitive adhesive layer 14 is deposited on top of logo 12 (on its printed side), and the above layers are supported by a water soluble slip layer 16 carried by decal paper 18. Pressure sensitive adhesive layer 14 stays dry and is not tacky prior to application of the decal to the skin. Thus when the tattoo 10 is applied inside tattoo identification card 2 (in FIG. 1). there is no adhesion of the pressure sensitive adhesive when contacted by the back side of front panel 4 (of FIG. 1).

The film 13 and imprinted design 12 are preferably as thin as possible. The decal paper 18 and slip layer 16 protect the film 13 and lithograph design 12 until they are actually applied (e.g., to the skin of the user). The pressure sensitive adhesive 14 enables the printed film 13 to be secured in place while its integrity is protected by the decal paper 18. Thereafter, the pressure sensitive adhesive layer 14 adheres the film 13 and multi-color lithographed design 12 against the user's skin so that it is not disrupted during wetting and removing the paper 18 and slip layer 16. or during wiping off of any residual material. Further, the film 13 protects the printed design 12 during the time it is in placed on the child's skin so that the skin surface and applied film 13 and design 12 may be washed (it will withstand mild detergents such as soap). The film 13 and design 12 may be removed when desired using an appropriate stronger solvent. Extreme thinness of the film 13 and lithographed design 12 are important to make the film 13 less noticeable and to obtain a true appearance of a tattoo (whereby the color of the skin beneath the tattoo shows through and the design 12 seems to be part of the skin to which it is affixed). The thinness is also necessary to enable the film 13 and design 12 to flex and stretch with the skin 20 without cracking and to minimize stresses tending to separate the film 13 and design 12 from the skin 20 through disruption of the pressure sensitive adhesive bond to the skin.

The design 12 is preferably formed by a multi-color offset lithograph process using non-toxic ink, thereby insuring a colorful attention-grabbing and safe display. Slip layer 16 is formed by spraying or otherwise applying a coating comprising a solution of water soluble material to the base sheet of decal paper 18, and then drying slip layer 16. The area of decal paper 18 coated by slip layer 16 is preferably limited to the area which will receive the design 12. Thereafter, the coated area and, preferably the remaining area of decal paper 18 are coated lithographically with a very thin film 13 of a water resistant, flexible, extensible material. The film 13 is microscopically thin, preferably no thicker than necessary to resist penetration of water to the slip layer 16 and paper 18. A suitable film material is the material commercially available as a standard "offset overprint varnish" but other natural or synthetic materials such as, resin solutions having the necessary covering and water resistant properties may be used. Printing of a selected design 12 may employ normal procedures of multi-color offset printing. Film 13 protects the water soluble slip layer 16 against any wetting agent to which the paper 18 may be exposed during the printing process and protects the paper 18 against curling from exposure to printing agents. Pressure sensitive adhesive 14 is next applied over the printed design. A preferred adhesive is an aqueous emulsion of vinyl-acrylic copolymer, and a variety of suitable adhesives are commercially available. It is important that the adhesive layer 14 be uniform, and it has been found that an adhesive layer 14 having superior characteristics in the present relation is secured by application of the emulsion by a silk screen procedure. The adhesive is deposited in a thin, extremely uniform substantially invisible layer, which, after drying, does not cause perceptible visual interference between the design and the surface to which the tattoo is secured.

The underside of the decal paper 18 may be printed with tattoo application instructions, tattoo collector series information, etc.

To apply the finished tattoo 10, tattoo 10 is detached from the hang-tag 2, the application instructions are read, and water is applied to the decal paper 18 to wet it and to soften or dissolve the slip layer 16. The decal paper 18 and any residue is removed, leaving the design 12 in place.

Although the above-described tattoo 10 is presently preferred for use in the present invention, it should be understood that other tattoo constructions may serve as well and are considered to be within the spirit and scope of the present invention.

Figure 4:
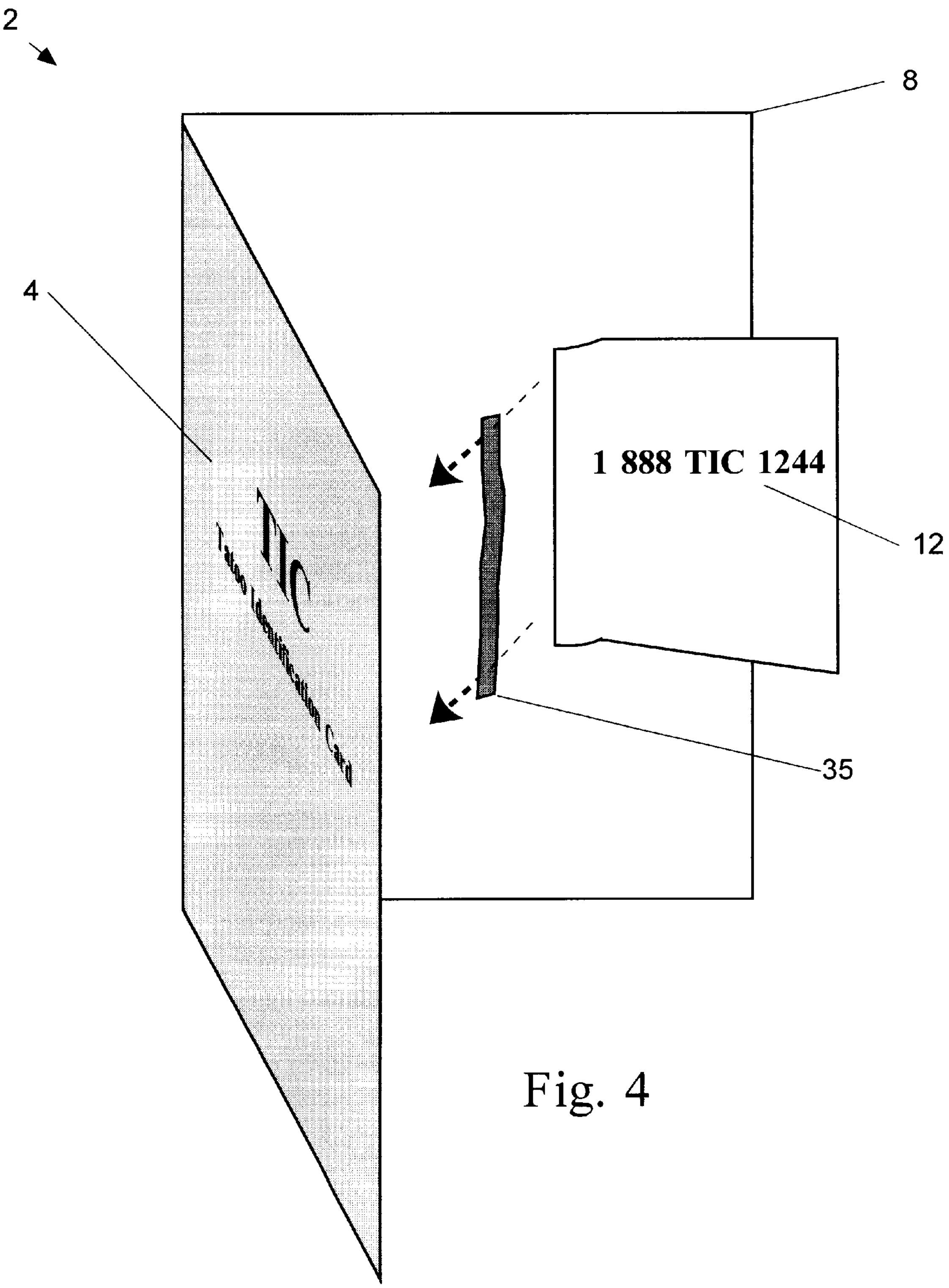
FIG. 4 is a perspective view illustrating the preferred manner of attaching the temporary tattoo 10 to the tattoo identification card 2.

FIG. 4 is a perspective view illustrating the preferred manner of attaching the temporary tattoo 10 to the tattoo identification card 2. The tattoo 10 is attached via its base piece of decal paper 18 to one side 8 of the interior of hang-tag 2 using the above-described reattachable bonding agent 35. Preferably, the reattachable bonding agent 35 is applied to the back side of the decal paper 18 along one edge for removably attaching that edge of the removable tattoo 10 to the card stock panel 8. The bonding agent may be applied linearly (as shown). or at one or more points along the edge of the tattoo 10 (or decal paper 18). The bonding agent may also be applied directly to the tattoo 10 or card stock panel 8, or it may be provided separately as a strip of tape for insertion between the decal paper 18 and panel 8. In all cases, this edgewise application makes it possible to raise the opposing free end of the tattoo 10 while the bonded edge remains attached to the card stock panel 8. Additional printed subject matter can be included on the panel 8 but underneath the tattoo 10, and this information is obscured by the tattoo but is revealed when the opposing free end of the tattoo 10 is raised for easy removal. This is well-suited for displaying certain types of information, e.g., telephone numbers, etc. Such information has more visual impact and is more closely associated with the tattoo when is positioned there beneath to be uncovered by lifting of the tattoo 35. Moreover, the edgewise application of bonding agent is important inasmuch as the tattoo can be more easily removed from the panel 8 without destroying the tattoo or the underlying print.

Figure 5:
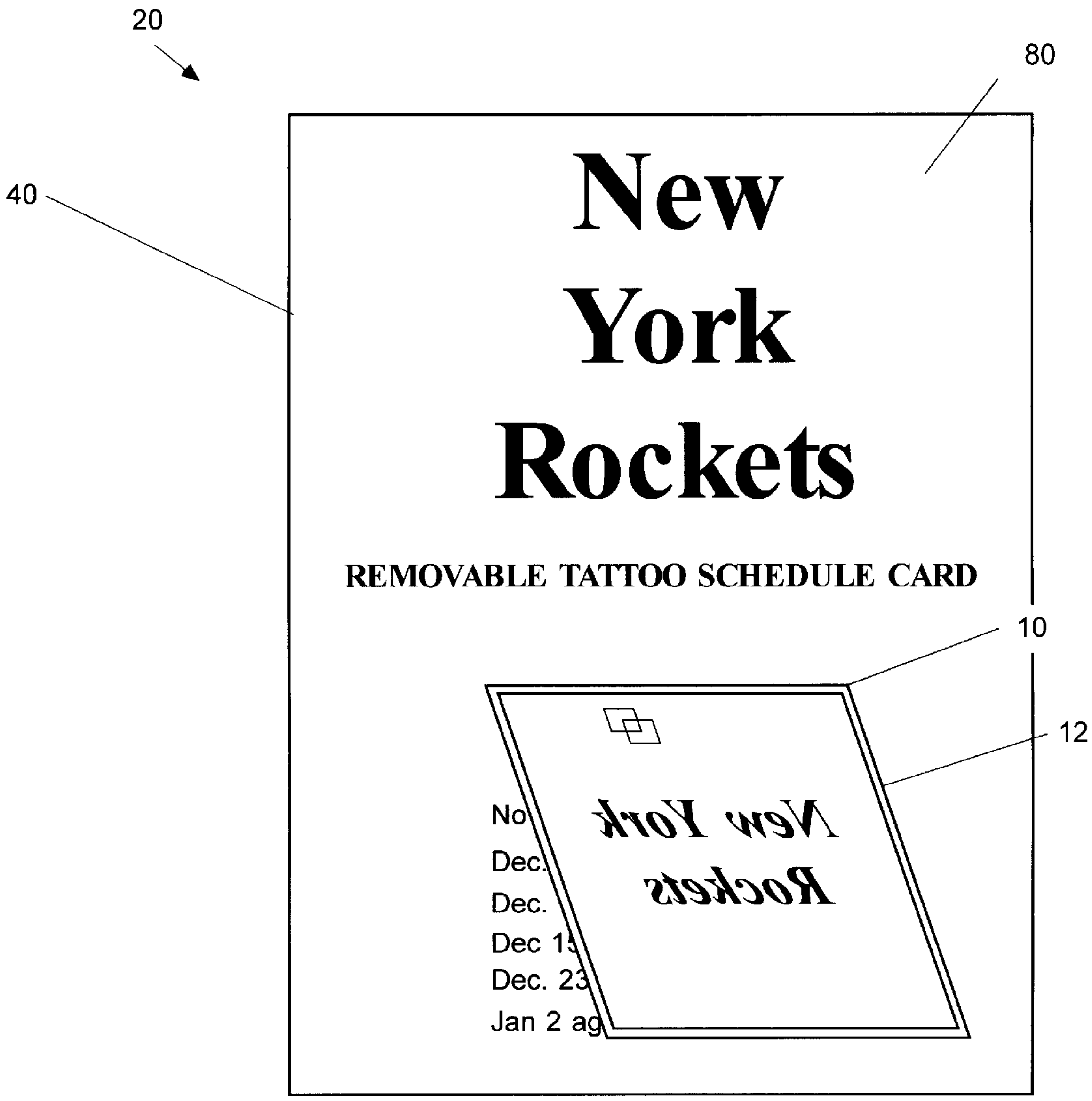
FIG. 5 is a front perspective view of an exemplary schedule card 20 with integral temporary tattoo 10 according to a second embodiment of the present invention.

FIG. 5 is a front perspective view of an exemplary single-ply promotional schedule card 20 with integral temporary tattoo 10 according to a second embodiment of the present invention. In this embodiment, the schedule card 20 is a single sheet of laminated card-stock (not folded). The front panel 40 is printed and/or embossed (as shown) to convey fixed scheduling information such as the schedule of a basketball team. On the other hand, the hang-tag 20 and the information borne on it are provided by a sponsor of the basketball team. The identity of the sponsor generally is not known until the schedules have been printed. The need exists for an economical way of giving sponsors an opportunity to add promotional information. These and other above-described objects are accomplished by incorporating the same removable tattoo 10 bearing a second design such as the sponsor's logo 12.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood therefore that within the scope of the appended claims, the invention may be practiced otherwise than as specifically set forth herein.

I claim:

1. A tattoo identification card with integral removable tattoo to assist in locating a person, comprising:

a coated card stock sheet having at least one surface bearing a primary printed section capable of being filled in with individual identification information relating to said person; and a removable tattoo displaying secondary printed matter, said tattoo further comprising, a panel of porous decal paper, a water soluble slip layer carried on one side of said porous decal paper, a water resistant film carried on said water soluble slip layer, secondary identification information printed on said water resistant film and serving in combination with said printed section of the coated card stock sheet to assist in identifying said person, and a layer of pressure sensitive adhesive covering the secondary printed matter; and a reattachable bonding agent applied to the other side of said porous decal paper along an edge thereof for removably attaching said edge of said removable tattoo to said coated card stock sheet, the attached tattoo thereby obscuring at least a portion of said printed section until removed;

whereby said coated card stock sheet is intended for conveying individual identification information, and said removable tattoo, which may be removed and applied elsewhere, adds the capability of conveying secondary identification information.

2. The tattoo identification card with integral removable tattoo according to claim 1, wherein said card stock sheet is a single-ply card having a front panel bearing said printed subject matter.

3. The tattoo identification card with integral removable tattoo according to claim 1, wherein said card stock sheet is a folded card having a front panel bearing said printed subject matter, and an interior panel for attaching said removable tattoo.

4. The tattoo identification card with integral removable tattoo according to claim 1, wherein said secondary printed matter comprises a multi-color offset print graphic printed on said water resistant film.

5. The tattoo identification card with integral removable tattoo according to claim 4, wherein said slip layer corresponds to an area occupied by said graphic.

6. The tattoo identification card with integral removable tattoo according to claim 5, wherein said water resistant film covers substantially the entire area of said decal paper.

7. The tattoo identification card with integral removable tattoo according to claim 6, wherein said water resistant film is matte surfaced.

8. A promotional schedule card with integral removable tattoo, comprising:

a laminated card stock sheet having at least one surface bearing a primary printed schedule;

a removable tattoo displaying secondary printed matter, said tattoo further comprising, a panel of porous decal paper, a water soluble slip layer carried on one side of said porous decal paper, a water resistant film carried on said water soluble slip layer, secondary printed matter printed on said water resistant film and relating to the schedule on the card stock sheet, and a layer of pressure sensitive adhesive covering the secondary printed matter; and a reattachable bonding agent applied to the other side of said porous decal paper along an edge thereof for removably attaching said edge of said removable tattoo to said card stock sheet;

whereby said removable tattoo is intended for displaying promotional material and at least partially covers the printed schedule of said card stock sheet for exposition of the printed schedule upon removal of said tattoo.

9. The promotional schedule card with integral removable tattoo according to claim 8, wherein said card stock sheet is a single-ply card having a front panel bearing said printed schedule.

10. The promotional schedule card with integral removable tattoo according to claim 8, wherein said card stock sheet is a folded card.

11. The promotional schedule card with integral removable tattoo according to claim 8, wherein said secondary printed matter comprises a multi-color offset print graphic printed on said water resistant film.

12. The promotional schedule card with integral removable tattoo according to claim 11, wherein said slip layer corresponds to an area occupied by said graphic.

13. The promotional schedule card with integral removable tattoo according to claim 12, wherein said water resistant film covers substantially the entire area of said decal paper.

14. The promotional schedule card with integral removable tattoo according to claim 13, wherein said water resistant film is matte surfaced.

* * * * *